(12) United States Patent
Kernbaum et al.

(10) Patent No.: US 12,018,725 B2
(45) Date of Patent: Jun. 25, 2024

(54) SHAFT COUPLINGS

(71) Applicant: SRI INTERNATIONAL, Menlo Park, CA (US)

(72) Inventors: Alexander Kernbaum, Sunnyvale, CA (US); Murphy Kitchell, Menlo Park, CA (US)

(73) Assignee: SRI International, Menlo Park, CA (US)

(*) Notice: Subject to any disclaimer, the term of this patent is extended or adjusted under 35 U.S.C. 154(b) by 758 days.

(21) Appl. No.: 17/054,889

(22) PCT Filed: May 15, 2018

(86) PCT No.: PCT/US2018/032722
§ 371 (c)(1),
(2) Date: Nov. 12, 2020

(87) PCT Pub. No.: WO2019/221703
PCT Pub. Date: Nov. 21, 2019

(65) Prior Publication Data
US 2021/0364046 A1    Nov. 25, 2021

(51) Int. Cl.
*F16D 3/04* (2006.01)
*F16D 3/48* (2006.01)
(Continued)

(52) U.S. Cl.
CPC ............... *F16D 3/04* (2013.01); *F16D 3/48* (2013.01); *F16H 1/32* (2013.01);
(Continued)

(58) Field of Classification Search
CPC ..... F16D 3/04; F16D 3/48; F16H 1/32; F16H 9/24; F16H 55/36; F16H 2001/325; Y10T 74/18544
(Continued)

(56) References Cited

U.S. PATENT DOCUMENTS

| 916,914 A | * | 3/1909 | Cooley | F16D 3/04 464/103 |
| 1,015,434 A | * | 1/1912 | Gray | F16H 37/12 74/86 |

(Continued)

FOREIGN PATENT DOCUMENTS

| EP | 2354594 A1 | 8/2011 |
| JP | 50-20954 | 3/1975 |

(Continued)

OTHER PUBLICATIONS

The International Search Report (ISR) with Written Opinion for PCT/US2018/032722 dated Sep. 14, 2018, pp. 1-13.

*Primary Examiner* — Greg Binda
(74) *Attorney, Agent, or Firm* — McDonnell Bohnen Hulbert & Berghoff LLP

(57) ABSTRACT

A variety of mechanisms are provided for coupling the rotation of shafts or other mechanical elements having parallel but offset axes of rotation. The coupling mechanisms can couple such input and output elements via pins that are in contact with the input and output elements. The pins, upon rotation of the input and output elements, can engage in substantially pure rolling motion with respect to respective contact surfaces on the input and output members. Accordingly, the pins can reduce the number of bearings and increase efficiency relative to alternative coupling mechanisms. Such couplings may be employed in a variety of applications, including the coupling of rotations between elements of a cycloidal drive or a transmission that includes a member that undergoes cycloidal motion. For example, this coupling could replace the cage gear of a cycloidal drive in coupling the output to the cycloidal disc of a cycloidal drive.

20 Claims, 5 Drawing Sheets

(51) Int. Cl.
 *F16H 1/32* (2006.01)
 *F16H 9/24* (2006.01)
 *F16H 55/36* (2006.01)
(52) U.S. Cl.
 CPC .......... *F16H 2001/325* (2013.01); *F16H 9/24* (2013.01); *F16H 55/36* (2013.01); *Y10T 74/18544* (2015.01)
(58) Field of Classification Search
 USPC ...................................... 464/103, 105; 74/86
 See application file for complete search history.

(56) References Cited

U.S. PATENT DOCUMENTS

| | | | |
|---|---|---|---|
| 3,664,153 A * | 5/1972 | Sugahara | .................. F16D 3/04 464/102 |
| 4,259,043 A * | 3/1981 | Hidden | ................... F01C 17/06 464/103 |
| 5,109,963 A | 5/1992 | Husted et al. | |
| 10,704,604 B2 * | 7/2020 | Kerr | ......................... F16D 3/04 |
| 2015/0005130 A1 | 1/2015 | Yamamoto et al. | |
| 2017/0059029 A1 | 3/2017 | Sasaki | |

FOREIGN PATENT DOCUMENTS

| | | |
|---|---|---|
| JP | S59-117941 A | 7/1984 |
| JP | 2002-266955 A | 9/2002 |
| JP | 2014-66262 A | 4/2014 |
| WO | 2010052978 A1 | 5/2010 |
| WO | 2013/062378 | 5/2013 |

\* cited by examiner

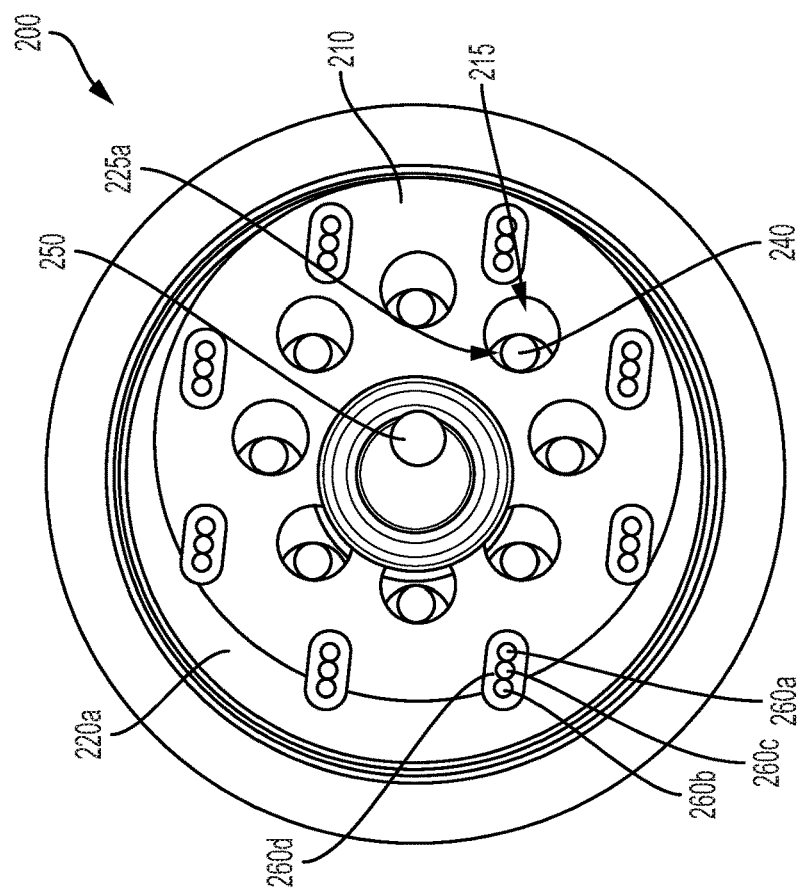
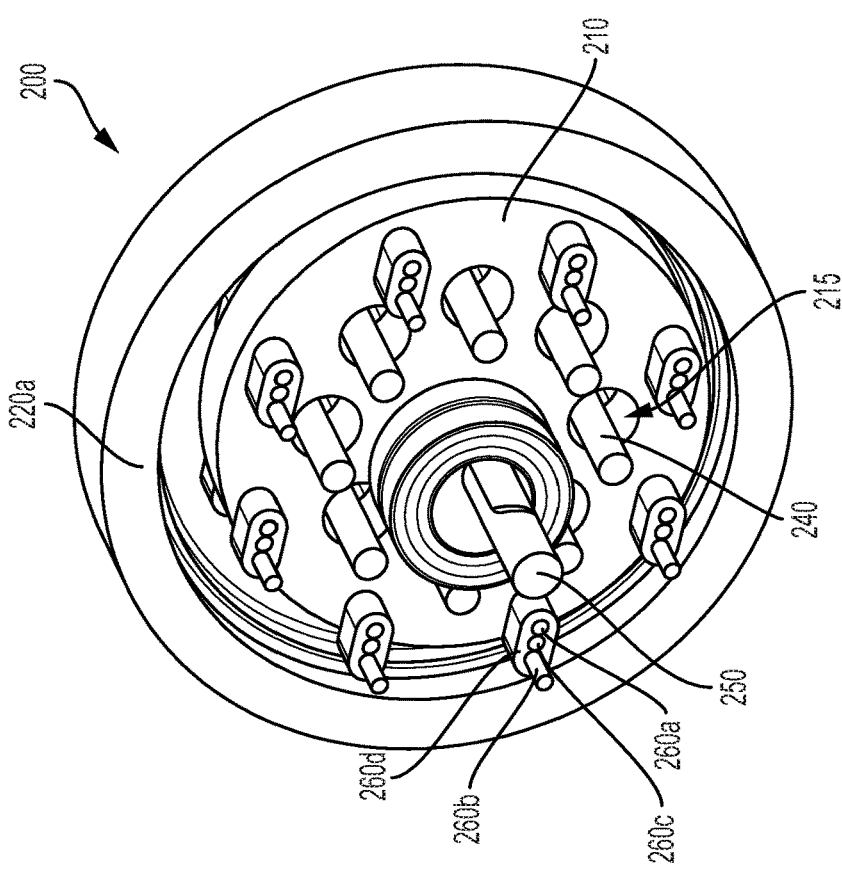
FIG. 2A
FIG. 2B

SHAFT COUPLINGS

BACKGROUND

Unless otherwise indicated herein, the materials described in this section are not prior art to the claims in this application and are not admitted to be prior art by inclusion in this section.

Couplings are included as part of a variety of mechanisms to couple shafts or other rotating mechanical elements such that torques and rotations may be transmitted between the mechanical elements. A coupling may be configured to permit transmission of rotations/torques between shafts that have offset axes of rotation, that have non-parallel axes of rotation, or that differ in some other way with respect to their axes of rotation. For example, an Oldham coupling couples two shafts having parallel but offset axes of rotation. In some examples, a coupling may be configured to permit the shafts (or other coupled rotating mechanical elements) to vary over time with respect to the location and/or angle of their axes of rotation. For example, a universal joint couples two shaft having rotational axes at different angles and permit those angles to very over time.

Couplings may be provided as part of another mechanism. For example, a transmission may include one or more couplings to couple rotation of elements within the transmission. In particular, a variety of transmissions (e.g., a cycloidal drive) include one or more elements that engage in cycloidal motion and that are coupled to an output shaft (or other output element) of the transmission. Such cycloidal motion can be described as rotation about an axis of rotation that is, itself, orbiting about another axis of rotation. In a cycloidal drive or in other mechanisms, the axis of rotation of a first element (e.g., a cycloid gear) may be orbiting about the axis of rotation of an output element (e.g., as the first element is driven by a cam coupled to an input of the mechanism). The offset between the axis of rotation of the first element and the axis of rotation of the output element may remain substantially constant.

Transmissions are included as part of a variety of mechanisms in order to provide a mechanical advantage between an input torque and an output torque. Thus, a transmission may be included to match properties of a motor, engine, turbine, or other torque generator (e.g., a torque-speed curve, an efficiency curve) to properties of an effector, a wheel, a generator, or some other intended application for a generated torque. For example, a transmission may be provided in an automobile to match the high rotational speed and relatively lower torque generated by an internal combustion engine to lower speed and higher torque requirements for driving the wheels of automobile. In another example, a transmission may be provided to couple an internal combustion engine to a generator such that both the internal combustion engine and the generator are operated according to respective efficient rotational speeds.

SUMMARY

Some embodiments of the present disclosure provide a coupling for transmitting torque with high efficiency and high stiffness from a first axis of rotation to a second axis of rotation that are offset from each other. The coupling includes: (i) a first member configured to rotate about the first axis of rotation and having a first plurality of holes and a second plurality of holes; (ii) a second member configured to rotate about the second axis of rotation and having a third plurality of holes; and (iii) a plurality of pins. The first member and the second member are coupled to each other such that (a) the first axis of rotation of the first member and the second axis of rotation of the second member are parallel and maintained at a set offset distance relative to each other, and (b) each hole of the third plurality of holes is disposed between a corresponding hole of the first plurality of holes and a corresponding hole of the second plurality of holes. Each respective pin of the plurality of pins is disposed within a respective hole of the first plurality of holes, a respective hole of the second plurality of holes, and a respective hole of the third plurality of holes such that the plurality of pins can transmit torque between the first member and the second member.

Some embodiments of the present disclosure provide a coupling for transmitting torque with high efficiency and high stiffness from a first axis of rotation to a second axis of rotation that are offset from each other. The coupling includes: (i) a first member configured to rotate about the first axis of rotation and having a first plurality of rods extending from the first member parallel to the first axis and a second plurality of rods extending from the first member parallel to the first axis; (ii) a second member configured to rotate about the second axis of rotation and having a third plurality of rods extending from second member parallel to the second axis and a fourth plurality of rods extending from the second member parallel to the second axis; (iii) a first plurality of rollers; and (iv) a second plurality of rollers. The first member and the second member are coupled to each other such that the first axis of rotation of the first member and the second axis of rotation of the second member are parallel and maintained at a set offset distance relative to each other. Each respective roller of the first plurality of rollers is in contact with a respective rod of the first plurality of rods and a respective rod of the third plurality of rods such that the first plurality of rollers can transmit torque from the first member to the second member. Each respective roller of the second plurality of rollers is in contact with a respective rod of the second plurality of rods and a respective rod of the fourth plurality of rods such that the second plurality of rollers can transmit torque from the first member to the second member.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 2A is a perspective view of a partially-disassembled example coupling.

FIG. 2B is a front view of the partially-disassembled coupling shown in FIG. 2A.

DETAILED DESCRIPTION

Figure 1B:
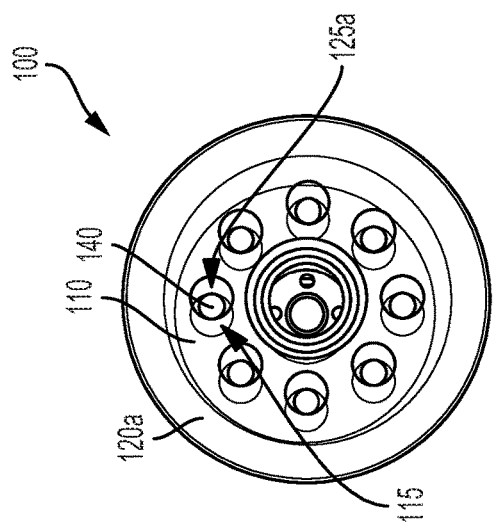
FIG. 1B is a front view of the coupling shown in FIG. 1A.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Couplings are provided in a variety of applications to transfer rotation and torque between shafts or other mechanical elements. Couplings can couple rotations between shafts that differ with respect to the angle and/or location of their axes of rotation and may be characterized by a variety of properties (e.g., low backlash, high efficiency, high stiffness, low velocity or torque ripple). Couplings can be provided within transmissions, engines, differentials, or other mechanisms to transfer energy (e.g., rotation, torque) between elements of the mechanisms (e.g., between a cycloidal disc of a cycloidal drive and an output of the cycloidal drive). It is generally preferred that such couplings be characterized by high efficiency, so as to minimize energy losses during operation of a mechanism containing the coupling.

In a variety of applications, it is desirable to provide a coupling that couples rotation and torque from a first shaft or other element, which rotates about a first axis of rotation, to a second shaft or other element that rotates about a second axis of rotation that is offset from, but substantially parallel to, the first axis of rotation. For example, in a cycloidal drive, a cycloidal disc is driven by a cam to rotate about an axis of rotation that, itself, orbits the axis of rotation of the input cam (i.e., the cycloidal disc engages in cycloidal motion). In order to extract an output rotation/torque from the cycloid member, a coupling must be provided between the cycloid member and an output member, whose axis of rotation is the same as the axis of rotation of the input cam. Thus, the axis of rotation of the cycloid member orbits about the axis of rotation of the output at a set offset distance.

A coupling that has high efficiency, high power, and high stiffness may be provided for such an application. In order to provide these benefits, the coupling can include a plurality of pins or rollers that are in contact with both a first member of the coupling (e.g., an input shaft, a cycloidal disc of a cycloidal drive) and a second member of the coupling e.g., an output plate coupled to an output shaft) such that torque is transmitted from between the first and second members via the pins. The pins may be in contact with the first and second members via contact surfaces that are shaped (e.g., as cylindrical contact surfaces) such that, as the first and second members rotate, the pins rotate as well. Further, the pins can engage in substantially pure rolling motion with respect to the contact surfaces of the first and second members, allowing for increased efficiency, increased power capacity, and reduced cost (e.g., no bearings at the contact surface between the pins and the first and second members).

In some examples, the pins can be disposed within pockets, pits, holes, or other features formed within the first and second members. To balance the forces exerted on the pins by the first and second members, first and second sets of opposing holes could be formed in the first member, while a third set of holes is formed in the second member such that each holes in the third set of holes is disposed between a hole from the first set of holes and an opposite hole from the second set of holes. Additionally or alternatively, the pins can be disposed between shafts, cylinders, rods, tubes, or other elements formed from and/or rigidly coupled to the first and second members.

II. Example Couplings

In a variety of applications, it can be beneficial to provide a coupling that couples rotation and torque between two axes of rotation that are substantially parallel and that are onset from each other by a distance. Such a coupling could be advantageous to, e.g., offset a rear drive shaft of an automobile downward or to provide additional space within a cabin of the automobile. Such a coupling could be advantageous to couple the rotation of an element of a transmissions (or other mechanism) to an output of the transmission where the element of the transmission undergoes cycloidal motion (i.e., wherein an element of the device rotates about an axis of rotation that, itself, orbits about another axis of rotation). For example, cycloidal drives or similar mechanisms can include cage gears or other coupling mechanisms to couple the motion of an output member, rotating about a first axis of rotation, to the cycloidal motion of an internal member (e.g., a cycloidal disc) that rotates about a second axis of rotation that is located at a fixed offset distance from the first axis of rotation and that orbits about the first axis of rotation. Such a coupling could provide benefits in other applications.

Such a coupling may be designed to improve a variety of characteristics, including efficiency, backlash, backdrivability, stiffness, and cost. To increase the efficiency of such a coupling, bearing surfaces within the coupling that engage in sliding motion relative to each other may be equipped with needle bearings, ball bearings, or other types of roller bearings. Such surfaces may include surfaces of a cage gear used to couple a cycloidal disc of a cycloidal drive to an output of the cycloidal drive, or a cage gear or similar element(s) used to couple rotations between similar components of some other transmission or mechanism. However, the use of such roller bearings may increase the cost of the coupling. Additionally, a roller bearing may have a decreased load capacity and stiffness relative to, e.g., a thrust bearing or other type of sliding bearing surface.

Alternatively, a coupling may be configured such that a bearing surface within the coupling can engage in substantially pure rolling motion. For example, bearing surfaces can move relative to each other by rolling, with substantially no sliding between the bearing surfaces. Friction losses due to such rolling motions (i.e., due to rolling friction) are significantly less than losses due to sliding motions (i.e., due to sliding friction). Accordingly, roller bearings or other friction-reducing elements may be omitted or reduced, permitting a reduction in cost and an increase in load capacity. Additionally, such substantially pure rolling bearing surfaces may be increased in area or size, allowing for the load capacity of the coupling to be further increased. Couplings described herein provide such a coupling that includes one or more bearing elements or surfaces that can engage in substantially pure rolling motion relative to each other. Accordingly, these couplings may provide increased efficiency, load capacity, stiffness, and other benefits relative to alternative coupling configurations (e.g., cage gears that include roller bearings disposed about the cage gear teeth).

Such couplings can be configured in a variety of ways to provide such high-load, rolling bearing surfaces. In some examples, the coupling can include first and second members (e.g., an input member and an output member, a cycloidal disc and an output member) that are in contact, via respective contact surfaces, with a plurality of pins. Torque is transmitted between the first and second members, via the respective contact surfaces, via the pins. The pins, and the contact surfaces, are shaped such that, when the first and second members rotate, the pins also rotate such that they engage with the contact surfaces in a substantially purely rolling manner.

In some examples, this can include the pins being disposed within pockets, pits, holes, or other features formed within the first and second members. To balance the forces exerted on the pins by the first and second members, first and second sets of opposing holes (representing first and second sets of contact surfaces) could be formed in the first member, while a third set of holes (representing a third set of contact surfaces) is formed in the second member. Each pin (of the plurality of pins) is disposed within a respective hole of each of the first, second, and third set of holes such that force applied to the pin by contact with the second member is balanced by forces applied to the pin, via a hole from the first set of holes and an opposite hole from the second set of holes, by the first member. Additionally or alternatively, the pins can be disposed between shafts, cylinders, rods, tubes, or other elements formed from and/or rigidly coupled to the first and second members.

Figure 1A:
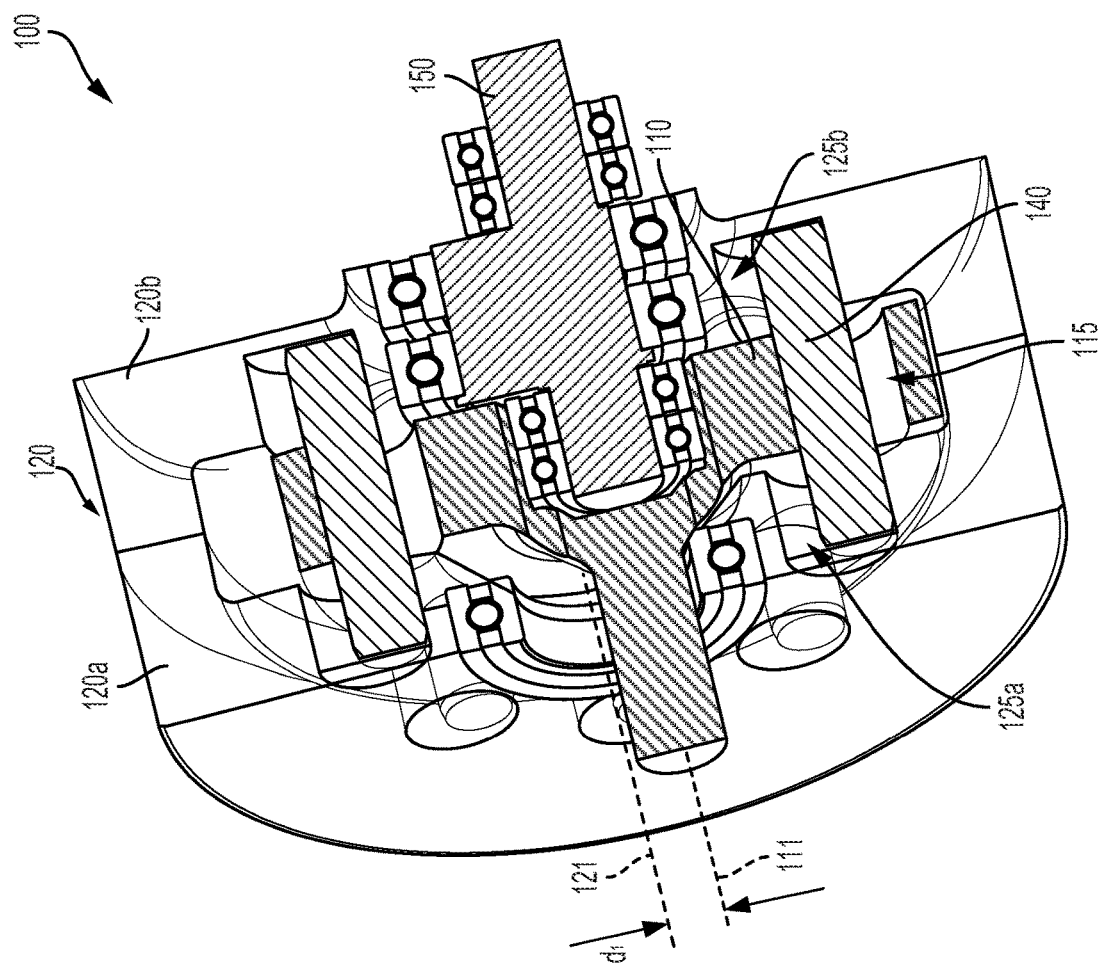
FIG. 1A is a perspective cross-sectional view of an example coupling.

Relevant aspects of such a coupling are illustrated by way of example in FIGS. 1A and 1B. FIG. 1A shows a perspective cross-sectional view of a coupling 100; FIG. 1B shows a front view of the coupling 100. The coupling 100 includes a first member 110 and a second member 120 that includes opposite first 120a and second 120b plates. The first 120a and second 120b plates are bolted together or otherwise rigidly coupled together. The first member 110 rotates about a first axis of rotation 111 and the second member 120 rotates about a second axis of rotation 121. The axes of rotation 111, 121 are substantially parallel and offset from each other by a non-zero distance $d_1$. The location and angle of the axes of rotation 111, 121 are maintained by a support member 150, to which the first 110 and second 120 members are coupled via respective bearings.

The coupling 100 also includes a plurality of pins (exemplified by pin 140). A first plurality of holes (exemplified by first hole 115) is formed in the first member 110. Second and third pluralities of holes (exemplified by second hole 125a and third hole 125b, respectively) are formed in the second member 120. Each hole in the first member 110 is disposed between a corresponding hole of the second plurality of holes and a corresponding hole of the third plurality of holes. This is illustrated by the first hole 115 being disposed between the second hole 125a and the third hole 125b. Each pin of the coupling 100 is disposed within a respective hole of each of the first, second, and third pluralities of holes. This is illustrated by the pin 140 being disposed within the first 115, second 125a, and third 125b holes. Each pin is in contact with a contact surface of the corresponding holes such that the pin may transmit a torque between the first 110 and second 120 members of the coupling 100. The second member 120 includes two sets of opposed holes such that forces/torques thus applied on a pin are balanced, preventing the pins from being rotated out of alignment and/or reducing the need for additional bearings or other mechanisms to maintain the pins in alignment with the other elements of the coupling 100.

The pins (e.g., 140) and holes (e.g., 115, 125a, 125b) are shaped and/or sized such that rotation of the first 110 and second 120 members results in rotation of the pins in such a manner that the pins engage in substantially pure rolling motion relative to the internal surfaces of the holes. The pins engaging in pure rolling motion relative to the surfaces of the holes means that a given point of contact on the pin that is in contact with a given point of contact on the surface of the hole exhibit zero (or substantially zero) velocity relative to each other and/or that the given points of contact have the same (or substantially the same) absolute velocity. Such contact surfaces engaging in pure, or nearly pure, rolling motion relative to each other has benefits with regard to increasing the efficiency of power transmission via the contact surfaces, with regard to reducing wear experienced by the surfaces, with regard to reducing the required lubrication or other friction-reducing means present at the contact surface, or with regard to other benefits. In some examples, a mechanism as described herein could be configured to exhibit a certain amount of deviation from pure rolling motion at such contact surfaces, in order to level the amount of wear experienced by the contact surfaces, to distribute lubrication along the contact surfaces, or to provide some other benefit.

In an example, the pins and holes could each correspond to a respective cylindrical shape. Accordingly, the pins may lack any additional bearing elements (as shown in FIGS. 1A/1B). The pins may be lubricated (e.g., to increase efficiency, to compensate for slight deviations from pure rolling motion relative to the hole surfaces). A load capacity of the coupling 100 can be increased by increasing the number of pins, by increasing the length of the pins, and/or by increasing the diameter of the pins. The diameter of the pins and/or the holes can be related to the offset distance between the first 111 and second 121 axes of rotation.

Note that the number of pins/holes shown as part of the coupling 100 in FIGS. 1A and 1B (i.e., eight) is intended as a non-limiting example of the number and spacing of such pins. A coupling as described herein includes a number of pins (and corresponding holes) specified according to an application. To provide stability of the coupling, the coupling can include three or more such pins and/or rollers. To increase the load capacity of the coupling, to provide for redundancy, or to provide other benefits, the coupling can include additional pins and/or rollers (e.g., four or more pins and/or rollers).

Disposing sets of pins within sets of holes, as illustrated in FIGS. 1A and 1B above, is only one way to implements a coupling that transmits torque via elements engaged in substantially purely rolling motion. Such a coupling could additionally or alternatively include rollers that are in contact with respective sets of additional pins, rods, tubes, or otherwise thrilled or shaped elements having contact surfaces specified to allow the pins to transmit torque between first and second member and to engage in substantially purely rolling motion, relative to such contact surfaces, when the first and second members rotate.

Relevant aspects of such a coupling are illustrated by way of example in FIGS. 2A and 2B. FIG. 2A shows a perspective view of a partially-disassembled coupling 200; FIG. 2B shows a front view of the disassembled coupling 200. The coupling 200 includes a first member 210 and a second member that includes opposite first 220a and second plates (second plate not shown). The first 220a and second plates are bolted together or otherwise rigidly coupled together. The first member 210 rotates about a first axis of rotation 211 and the second member 220a rotates about a second axis of rotation 221. The axes of rotation 211, 221 are substantially parallel and offset from each other by a non-zero distance.

The location and angle of the axes of rotation are maintained by a support member 250, to which the first 210 and second 220a members are coupled via respective bearings.

Similar to the coupling 100 illustrated in FIGS. 1A and 1B, the coupling 200 includes a plurality of pins (exemplified by pin 240). The pins are disposed within a first plurality of holes exemplified by a first hole 215) that is formed in the first member 210 and second and third pluralities of holes (exemplified by a second hole 225a) formed in the second member 220a (a portion of the second member and the third plurality of holes not shown). Each hole in the first member 210 is disposed between a corresponding hole of the second plurality of holes and a corresponding hole of the third plurality of holes. Each pin of the coupling 200 is disposed within a respective hole of each of the first, second, and third pluralities of holes such and in contact with a contact surface of the corresponding holes such that the pin may transmit a torque between the first 210 and second 220a members of the coupling 200. The pins (e.g., 240) and holes (e.g., 215, 225a) are shaped and/or sized such that rotation of the first 210 and second 220a members results in rotation of the pins in such a manner that the pins engage in substantially pure rolling motion relative to the internal surfaces of the holes.

The coupling 200 includes additional elements for transmitting a torque between the first and second members. The coupling 200 includes a plurality of rollers (exemplified by roller 260c). A first plurality of rods (exemplified by a first rod 260a) extends from the first member 210 parallel to the first axis 211 and a second plurality of rods (exemplified by a second rod 260b) extends from the second member parallel to the second axis 221 (the portion of the second member from which the second plurality of rods extends is not shown). Each roller in the plurality of rollers is disposed between, and in contact with, a corresponding rod of the first plurality of rods and a corresponding rod of the second plurality of rods. This is illustrated by the particular roller 260c being disposed between and in contact with the first rod 260a and the second rod 260b. Each roller is in contact with a contact surface of the corresponding rods such that the roller may transmit a torque between the first 210 and second 220a members of the coupling 200. Cages (e.g., 260d) are provided to maintain the positioning of each of the rollers (e.g., 260c) between the corresponding rods (e.g., 260a, 260b). A complementary set of additional rollers and rods is disposed on the opposite side of the first member 210 (not shown) such that forces/torques thus applied between the members, via the rollers, are balanced, preventing the pins from being rotated out of alignment and/or reducing the need for additional bearings or other mechanisms to maintain the pins and/or first and second members in alignment with the other elements of the coupling 200.

A variety of benefits may be obtained by including both the pins-in-holes (240, 215, 225a, etc.) and the rollers (260a, 260b, 260c, etc.) to transmit torque between the first and second members of a coupling. One benefit may include an increase in the torque capacity of the coupling. Another benefit may include reducing the total reactive force applied between the first and second members when transmitting torque. When transmitting a torque between the first and second members, via the pins (including pin 240), a reaction force is applied between the first and second members, in a direction between the axes of rotation 211, 221, by the pins. Similarly, when transmitting a torque between the first and second members via the rollers (including roller 260c), a reaction force is applied between the first and second members in a direction opposite the direction of the reaction force applied by the pins. Thus, by providing both the pins-in-holes and the rollers, the total reaction force between the first and second members may be reduced or substantially eliminated. Correspondingly, a size, cost, load rating, or other design characteristic of bearings or other elements used to coupled such forces between the first and second members (e.g., via the support member 250) may be relaxed.

Note that the coupling 200, which includes both pins-in-holes and rollers for transmitting torque between first and second members, is intended as a non-limiting example embodiment. A coupling as contemplated herein may lack the pins-in-holes and may include only the rollers (and corresponding rods or other contact surfaces) for transmitting torques between first and second members of the coupling. Further, the specific number of pins/holes and rollers/rods shown as part of the coupling 200 in FIGS. 2A and 2B (i.e., eight) is intended as a non-limiting example of the number and spacing of such pins and rollers. A coupling as described herein includes a specified number of pins (and corresponding holes) and/or a specified number of rollers (and corresponding rods or other features in contact with the rollers). To provide stability of the coupling, the coupling can include three or more such pins and/or rollers. To increase the load capacity of the coupling, to provide for redundancy, or to provide other benefits, the coupling can include additional pins and/or rollers four or more pins and/or rollers).

The coupling 200 includes cages (e.g., 260d) to stabilize the rollers (e.g., 260c) between corresponding pairs of rods (e.g., 260a, 260b). These cages may be composed of a variety of materials. As the force through the rollers, between the rods, is carried by the roller directly, the cages may lack explicit roller bearings or other friction-reducing elements. Additionally or alternatively, the cages may be lubricated to reduce friction. The material may be chosen to provide a low-friction surface to the elements (roller, rods) it is in contact with (e.g., the cages may be composed of brass, polyoxymethylene, acrylonitrile butadiene styrene or some other low-friction material).

The coupling shown in FIGS. 1A and 1B includes an inner member (the first member, 110) that includes a first set of holes, flanked by opposite portions of an outer member (the second member 120), that each include a respective, opposed set of holes in order to maintain the location and orientation of the pins (e.g., 140) within the coupling without additional bearings or other mechanisms. As shown in FIGS. 1A and 1B, the two plates 120a, 120b of the outer, second member completely enclose the inner, first member 110 and thus may be rigidly coupled together using bolts, welds, or other ways of such coupling. However, such a method of coupling the plates of the outer member together may preclude the inner member from interacting with other mechanisms (e.g., a ring gear of a cycloidal drive, a belt of a nested split-pulley transmission) or may result in some other undesired consequence. Accordingly, it may be beneficial to use some other method to rigidly couple together the opposite portions (e.g., plates) of the outer member of a coupling as described herein.

One method to do so includes forming additional holes in the inner member, and disposing support members through such additional between the portions of the outer member. The geometry of the support members and of the additional holes are specified to prevent contact between the support members and the inner member.

Figure 3:
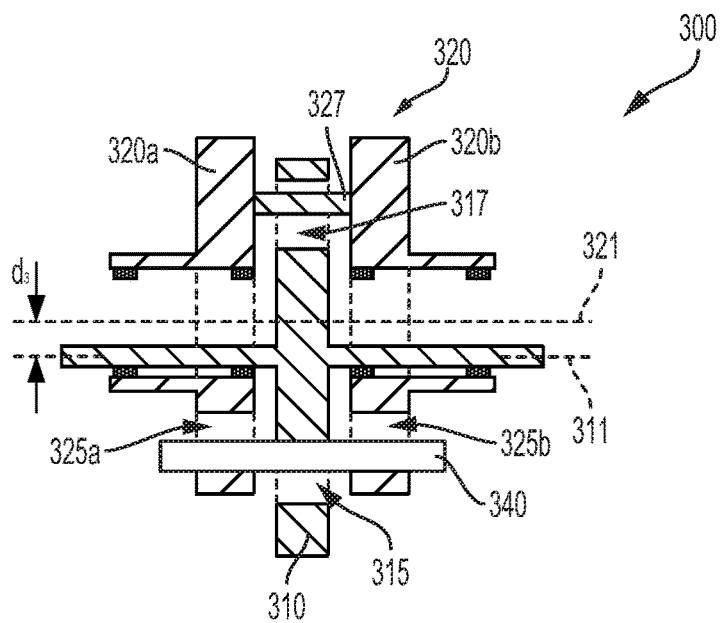
FIG. 3 is a cross-sectional view of an example coupling.

Relevant aspects of such a coupling are illustrated by way of example in FIG. 3, which shows a cross-sectional view of a coupling 300. The coupling 300 includes a first member 310 and a second member 320 that includes opposite first 320a and second 320b plates. The first 320a and second 320b plates are coupled together via at least one support member 327 that passes through a corresponding hole 317 in the first member 310. The first member 310 rotates about a first axis of rotation 311 and the second member 320 rotates about a second axis of rotation 321. The size and geometry of the hole 317 and support member 327 are such that the support member 327 does not contact the first member 310 (e.g., does not contact an internal surface of the hole 317) when the first 310 and second 320 members rotate about their respective axes 311, 321. The axes of rotation 311, 321 are substantially parallel and offset from each other by a non-zero distance $d_3$.

The coupling 300 includes a plurality of pins (exemplified by pin 340). The pins are disposed within first plurality of holes (exemplified by a first hole 315) that is formed in the first member 310 and second and third pluralities of holes (exemplified by a second hole 325a and third hole 325b, respectively) that are formed in the second member 320. Each pin of the coupling 300 is disposed within a respective hole of each of the first, second, and third pluralities of holes such and in contact with a contact surface of the corresponding holes such that the pin may transmit a torque between the first 310 and second 320 members of the coupling 300. The pins (e.g., 340) and holes (e.g., 315, 325a, 325b) are shaped and/or sized such that rotation of the first 310 and second 320 members results in rotation of the pins in such a manner that the pins engage in substantially pure rolling motion relative to the internal surfaces of the holes. Additionally or alternatively, the coupling 300 may include a set of rollers and corresponding rods (or other elements having contact surfaces corresponding to the rollers), similar to those shown in FIGS. 2A and 2B.

The arrangement of elements, shown in FIGS. 1A-B, 2A-B, and 3, to form couplings is intended as a non-limiting example embodiment. Pins, rollers, rods, holes, contact surfaces, support members, rotating members, bearings, or other elements of such a coupling and/or of elements coupled thereto may be configured in alternative ways. In some examples, one or both of the rotating members could include a contact surface configured to permit the coupling to operate as part of a transmission (e.g., as part of a cycloidal drive, as part of a nested split-pulley transmission).

III. Example Transmissions

Couplings as described herein (e.g., in connection with FIGS. 1A-B, 2A-B, and 3) may be applied in a variety of applications in order to couple rotation and torque from a first axis of rotation to a second axis of rotation that is offset from, and substantially parallel to, the first axis of rotation. For example, a variety of transmissions or other mechanisms require the coupling of cycloidal motion from a first member (e.g., from a cycloidal disc of a cycloidal drive, from a pulley or split-pulley of a nested-pulley transmission) to rotational motion of a second member. The cycloidal motion of the first member includes the rotation of the first member about an axis of rotation that, itself, orbits about the axis of rotation of the second member at a set offset distance. Couplings as described herein could be applied to such mechanisms to provide increased efficiency, increased stiffness, or other benefits to such a transmission or other mechanism.

Figure 4:
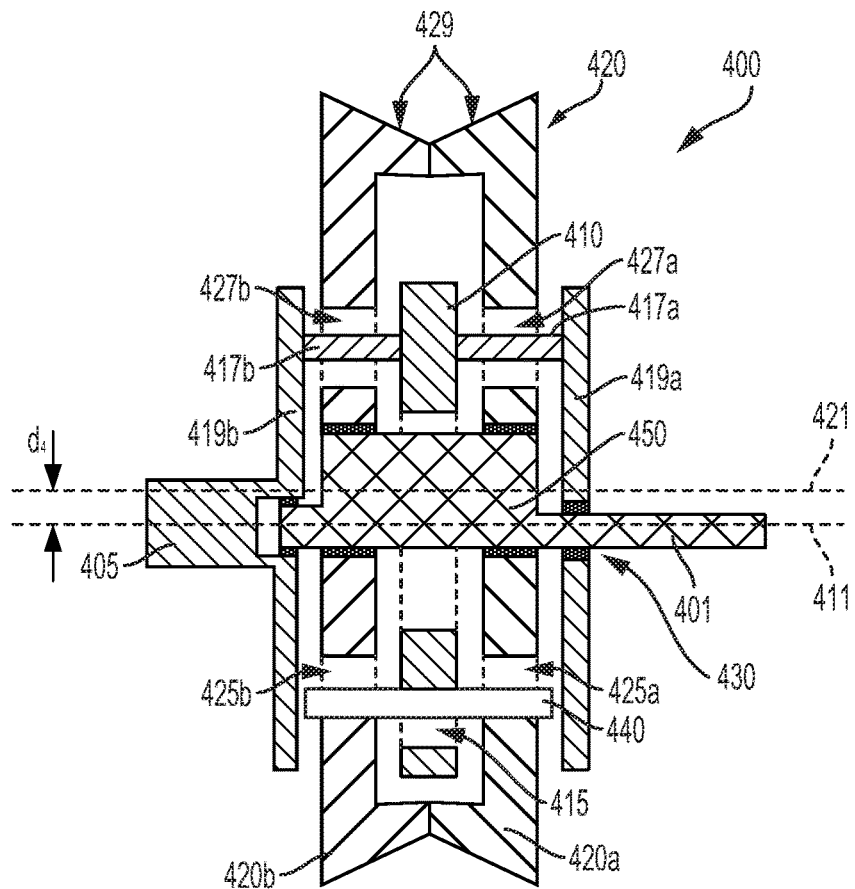
FIG. 4 is a cross-sectional view of an example transmission that includes a coupling.

Relevant aspects of such a transmission are illustrated by way of example in FIG. 4, which shows a cross-sectional view of a transmission 400. The transmission 400 includes a first member 410 that functions as an output of the transmission (via output shaft 405), a second member 420 that includes opposite first 420a and second 420b plates, and a third member 430 that functions as an input of the transmission and that includes an input shaft 401 and a cam 450. The first 420a and second 420b plates are bolted together or otherwise rigidly coupled together. The first member 410 and the third member 430 rotate about a first axis of rotation 411 and the second member 420 rotates about a second axis of rotation 421. The axes of rotation 411, 421 are substantially parallel and offset from each other by a non-zero distance $d_4$. The relative locations of the axes of rotation 411, 421 are maintained at a set distance from each other by the third member 430, to which the first 410 and second 420 members are coupled via respective bearings.

The second member 420 includes a contact surface 429 via which the second member 420 may be coupled to a housing (not shown) of the transmission 400. For example, the contact surface 429 may be shaped to contact a v-shaped belt which, in turn, contacts a split-pulley that forms part of the housing. In another example, the contact surface 429 is shaped to interact with a ring gear that is part of the housing.

Rotational input to the transmission 400, via the input shaft 401, causes rotation of the cam 450. The second member 420 is slidably coupled to the cam (e.g., via a roller beating) such that rotation of the cam 450 causes the second axis of rotation 421 to orbit about the first axis of rotation 411. This rotation, in combination with interaction between the second member 420 and the housing via the contact surface 429, results in the second member 420 undergoing cycloidal motion relative to the housing. That is, the second member rotates about the second axis of rotation 421 as the second axis of rotation 421 orbits about the first axis of rotation 411.

The transmission 400 includes a coupling to couple this cycloidal motion into a rotation of the first member 410. This coupling includes a plurality of pins (exemplified by pin 440), a first plurality of holes (exemplified by a first hole 415) formed in the first member 410, a second plurality of holes (exemplified by a second hole 425a) formed in the first plate 420a of the second member, and a third plurality of holes (exemplified by a third hole 425b) formed in the second plate 420b of the second member. Each hole in the first member 410 is disposed between a corresponding hole of the second plurality of holes and a corresponding hole of the third plurality of holes. This is illustrated by the first hole 415 being disposed between the second hole 425a and the third hole 425b. Each pin of the coupling is disposed within a respective hole of each of the first, second, and third pluralities of holes. This is illustrated by the particular pin 440 being disposed within the first 415, second 425a, and third 425b holes. Each pin is in contact with a contact surface of the corresponding holes such that the pin may transmit a torque between the first 410 and second 420 members.

Note that the coupling of the transmission 400 may additionally or alternatively include rollers and associated rods (or other contact surfaces) similar to those illustrated in FIGS. 2A-B for transmitting torque between the first 410 and second 420 members of the transmission 400.

To apply the rotation of the first member 410 to an output of the transmission 400 via the output shaft 405, the transmission additionally includes output plates 419a, 419b that are rigidly coupled to the first member 410 via support members 417a, 417b. These support members are disposed within additional holes 427a, 427b formed in the second member 420 such that the motion of the second member relative to the first member does not result in contact between the support members 417a, 417b and the second member 420.

As shown in FIG. 4, the "inner member" of a coupling could be part of the output of a transmission, while the "outer member" of the coupling (i.e., the portion of the coupling that includes paired plates or other portions opposite each other and including opposite pluralities of holes and/or rods) forms part of a cycloidal disc, inner pulley, or other intermediary element of the transmission 400. However, this is a non-limiting example embodiment, and a transmission that includes a coupling as described herein could be configured in a different way. For example, the "outer member" could form part of the output of the transmission, while the "inner member" is part of a cycloidal disc, inner pulley, or other intermediary element of the transmission 400.

Figure 5:
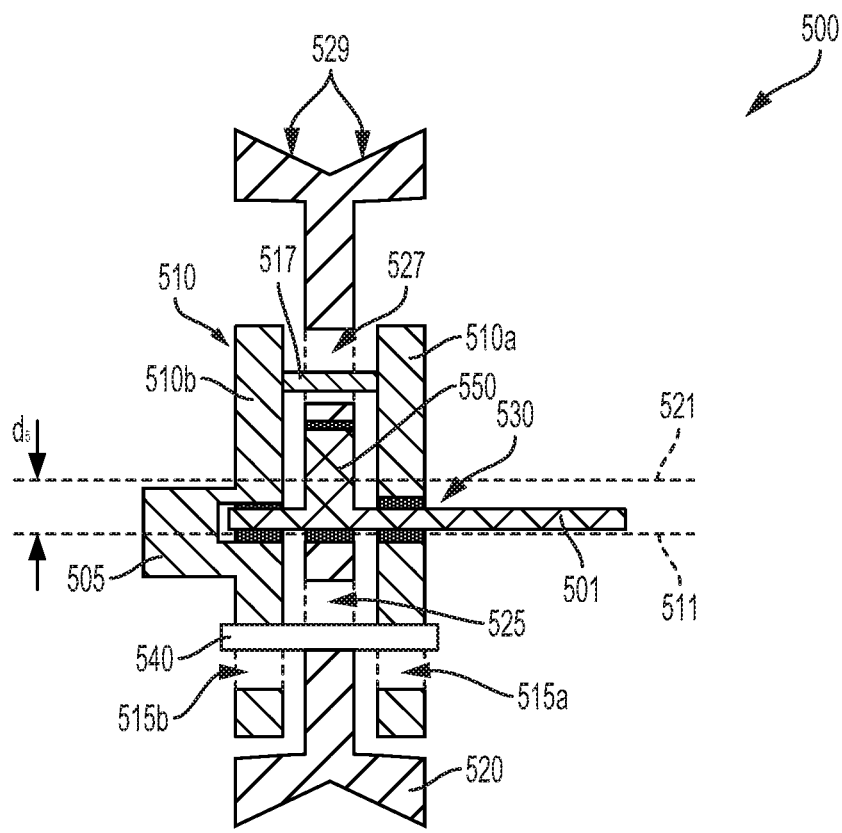
FIG. 5 is a cross-sectional view of an example transmission that includes a coupling.

Relevant aspects of such a transmission are illustrated by way of example in FIG. 5, which shows a cross-sectional view of a transmission 500. The transmission 500 includes a first member 510 that includes opposite first 510a and second 520b plates and that fractions as an output of the transmission (via output shaft 405), a second member 520, and a third member 530 that functions as an input of the transmission and that includes an input shaft 501 and a cam 550. The first 510a and second 510b plates are coupled together via at least one support member 517 that extends through a hole 527 formed in the second member 520. The first member 510 and the third member 530 rotate about a first axis of rotation 511 and the second member 520 rotates about a second axis of rotation 521. The axes of rotation 511, 521 are substantially parallel and offset from each other by a non-zero distance $d_5$.

The second member 520 includes a contact surface 529 via which the second member may be coupled to a housing (not shown) of the transmission 500. For example, the contact surface 529 may be shaped to contact a v-shaped belt which, in turn, contacts a split-pulley that forms part of the housing. In another example, the contact surface 529 is shaped to interact with a ring gear that is part of the housing.

Rotational input to the transmission 500, via the input shaft 501, causes rotation of the cam 550. The second member 520 is slidably coupled to the cam (e.g., via a roller bearing) such that rotation of the cam 550 causes the second axis of rotation 521 to orbit about the first axis of rotation 511. This rotation, in combination with interaction between the second member 520 and the housing via the contact surface 529, results in the second member 520 undergoing cycloidal motion relative to the housing. That is, the second member rotates about the second axis of rotation 521 as the second axis of rotation 521 orbits about the first axis of rotation 511.

The transmission 500 includes a coupling to couple this cycloidal motion into a rotation of the first member 510. This coupling includes a plurality of pins (exemplified by pin 540), a first plurality of holes (exemplified by a first hole 515a) formed in the first plate 510a, a second plurality of holes (exemplified by a second hole 515b) formed in the second plate 510b, and a third plurality of holes (exemplified by a third hole 525) formed in the second member 520. Each hole in the second member 520 is disposed between a corresponding hole of the first plurality of holes and a corresponding hole of the second plurality of holes. This is illustrated by the third hole 525 being disposed between the first hole 515a and the second hole 515b. Each pin of the coupling is disposed within a respective hole f each of the first, second, and third pluralities of holes. This is illustrated by the particular pin 540 being disposed within the first 515a, second 515b, and third 525 holes, Each pin is in contact with a contact surface of the corresponding holes such that the pin may transmit a torque between the first 510 and second 520 members.

Note that the coupling of the transmission 500 may additionally or alternatively include rollers and associated rods (or other contact surfaces) similar to those illustrated in FIGS. 2A-B for transmitting torque between the first 510 and second 520 members of the transmission 500.

As noted above in connection with FIGS. 4 and 5, one of the members of a coupling described herein can form a part of a cycloidal disc, pulley, or other intermediary element of a transmission such that the intermediary element engages in cycloidal motion relative to a housing or other fixed element (s) of the transmission. This cycloidal motion can be driven by an input of the transmission by a cam that is slidably coupled to the intermediary element and that is driven by the input) and the cycloidal motion can be coupled, via the coupling, to drive an output of the transmission. The intermediary member (e.g., the second member 420 of coupling 400, or the second member 520 of coupling 500) can be configured to couple, via a variety of means, with the housing of the transmission in order to cause the intermediary member to undergo the cycloidal motion in response to the transmission receiving an input rotation.

In some examples, the intermediary member could include a bearing surface shaped or otherwise configured to interact with a ring gear or other elements in order to result in the cycloidal motion. Relevant aspects of such a transmission are illustrated by way of example in FIG. 6, which shows a cross-sectional view of a transmission 600. The transmission 600 includes an intermediary member that includes a cycloidal disc 620, an output member 610, and an input member that includes a cam 650. The input member and the output member rotate about a first axis of rotation (indicated by the "+") and the intermediary member rotates about a second axis of rotation (indicated by the "x"). The cycloidal disc 620 includes a contact surface 629 via which the cycloidal disc is coupled to a housing 660 of the transmission 600. In particular, the contact surface 629 is shaped to contact teeth 665 of a ring gear that is part of the housing 660. The teeth 665 may be configured as roller bearings (e.g., to reduce sliding friction as the cycloidal plate 620 engages in cycloidal motion while in contact with teeth 665 of the ring gear).

Rotational input to the transmission 600 causes rotation of the cam 650. The cycloidal disc 620 is slidably coupled to the cam 650 (e.g., via a roller bearing) such that rotation of the cam 650 causes the second axis of rotation to orbit about the first axis of rotation. This rotation, in combination with interaction between the cycloidal disc 620 and the ring gear 665 via the contact surface 629, results in the cycloidal disc 620 undergoing cycloidal motion relative to the housing 660. That is, the cycloidal disc 620 rotates about the second axis of rotation as the second axis of rotation orbits about the first axis of rotation.

The transmission 600 includes a coupling to couple this cycloidal motion into a rotation of the output member 610. This coupling includes a plurality of pins (exemplified by pin 640), a first plurality of holes (exemplified by a first hole 625a) formed in the cycloidal disc 620, a second plurality of holes (exemplified by a second hole 615) formed in a first plate (or other portion) of the first member 610, and a third plurality of holes (not shown) formed in an additional plate or other portion of the first member 610 that is disposed opposite the cycloidal disc 620 from the second plurality of holes. Each hole in the cycloidal disc 620 is disposed between a corresponding hole of the first plurality of holes and a corresponding hole of the second plurality of holes. Each pin of the coupling is disposed within a respective hole of each of the first, second, and third pluralities of holes. Each pin is in contact with a contact surface of the corresponding holes such that the pin may transmit a torque between the cycloidal disc 620 and the output members 610. Additional holes (e.g., 627) are formed in the cycloidal disc 620 to permit support members (e.g., 617) to pass through the cycloidal disc 620 in order to rigidly coupled together opposite portions of the output member 610.

Figure 6:
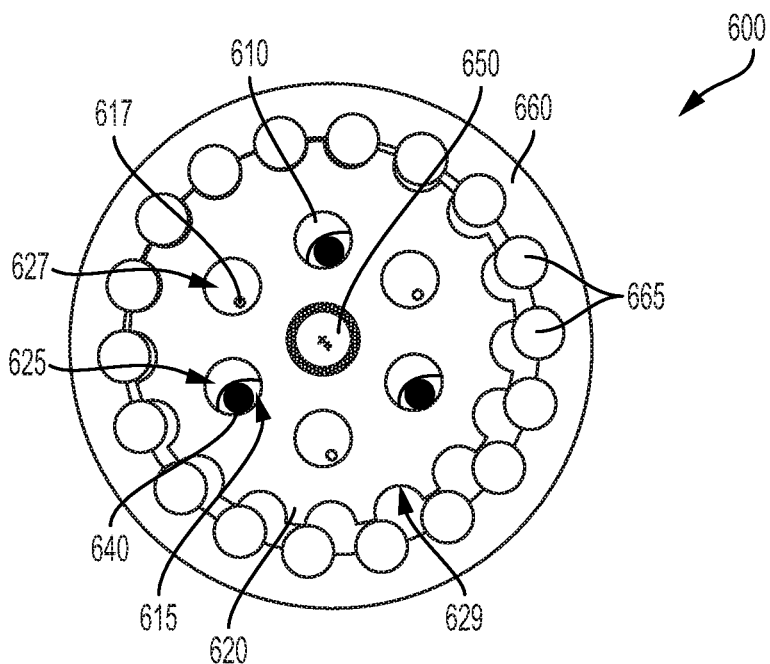
FIG. 6 is a cross-sectional view of an example transmission that includes a coupling.

The transmission 600 shown in FIG. 6 employs static roller bearings 665 as the teeth in a ring gear of a cycloidal drive. However, a transmission could be configured to include mobile bearings that are in contact with a first bearing surface on the intermediary member (e.g., 620) and in contact with a second bearing surface formed in a housing of the transmission. The shape of the bearings and the first and second bearing surfaces could be specified such that, as the intermediary member engages in cycloidal motion, the bearings (i) transmit forces between the intermediary member and the housing, (ii) rotate and engage in cycloidal motion themselves, and (iii) engage in substantially purely rolling motion relative to both the first bearing surface and the second bearing surface. An example of such a transmission is disclosed in International App. No. WO 2017/044171A2, which is incorporated herein by reference. Such a cycloidal drive, which transmits forces between a cycloidal plate and a housing via bearings that engage in substantially pure rolling motion, may exhibit increased efficiency, increased load bearing capacity, reduced cost (e.g., by reducing a number of bearings relative to conventional cycloidal drives), or other benefits relative to alternate configurations of a transmission.

In some examples, the intermediate member could incorporate a pulley (e.g., a grooved or otherwise-shaped surface configured to contact a belt or other flexible element) that is nested within another pulley that is coupled to a housing of a transmission. That is, some overlap occurs between the pulleys. Forces could be transmitted between the intermediate member and the housing via a belt that couples the pulley of the intermediate member to the pulley of the housing. The intermediate member could thus engage in cycloidal motion in response to a rotational input applied to the transmission. In some examples, the pulleys could be split pulleys, e.g., to facilitate adjustment of the transmission ratio of the transmission by controlling an axial separation between the pulley halves of the split pulleys.

Figure 7:
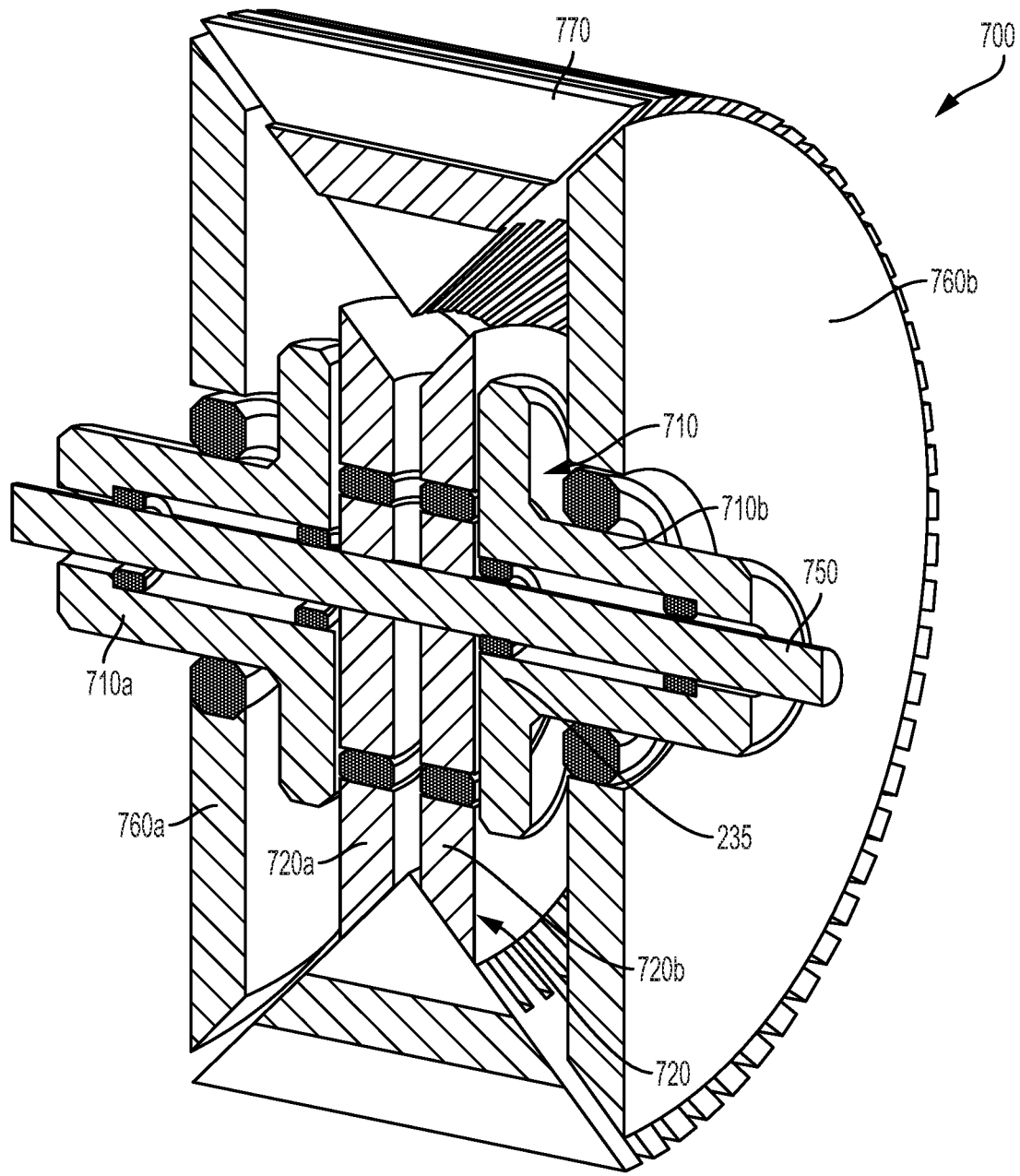
FIG. 7 is a perspective view of an example transmission that includes a coupling.

Relevant aspects of such a transmission are illustrated by way of example in FIG. 7, which shows a cross-sectional perspective view of a variable transmission 700. The variable transmission 700 includes a first split pulley having first 760a and second 760b half-pulleys that are coupled to a housing of the transmission (not shown). The transmission 700 additionally includes an intermediate member that includes a second split pulley having third 720a and fourth 720b half-pulleys. The first and second split pulleys are coupled via a belt 770. The second split pulley is nested within the first split pulley. This includes an axis of rotation of the second split pulley being located within an outer perimeter of the first split pulley. An input member 750 is coupled to the second split pulley via a cam and a cam bearing. The input member 750 and the second split pulley have respective different, offset axes of rotation. Rotation of the input 750 results in the axis of rotation of the second split pulley orbiting about the axis of rotation of the input 750, rotation of the half-pulleys 720a, 720b, and a transmission of torque from the first split pulley to the second split pulley via the belt 770. Thus, rotation of the input 750 may result in cycloidal motion of a particular portion of the second split pulley.

The transmission 700 additionally includes an output member 710 having first 710a and second 710b portions. The output member 710 rotates about an axis in common with the input 750. The transmission 700 may be configured to transmit a rotation and/or torque from the input member 750 to the output member 710 according to a controllable transmission ratio by mechanically grounding the half-pulleys of the first split pulley 760a, 760b to prevent them from rotating and by coupling the output member 710 to at least one of the half-pulleys of the second split pulley 720 such that rotation of the second split pulley results in rotation of the output member 710. This could include coupling the output member 710 to the second split pulley 720 via a coupling as described elsewhere herein.

Note that, while the transmissions described herein are characterized as including inputs from which power is transmitted to outputs, these transmissions may additionally or alternatively be configured to be back-drivable or otherwise configured to permit bidirectional energy transmission and/or energy transmission from output(s) to input(s). For example, transmissions as described herein could be used to bidirectionally transfer energy between joints of a robot, e.g., to increase the overall efficiency of the robot by permitting energy to be harvested from one joint (e.g., a joint currently receiving energy from, e.g., contact with the ground) and applied to another joint (e.g., a joint currently being employed to exert force on a payload), or vice versa. Additionally, such a configuration could permit multiple degrees of freedom (e.g., of one or more joints of a robot) to be driven by a single motor (e.g., via respective nested-pulley variable transmissions).

A transmission as described herein, or an element thereof (e.g., a coupling, a shifting mechanism to adjust the axial separation between halves of a split pulley) may include additional or alternative elements to facilitate some application. For example, a transmission may include additional gearing to, e.g., provide a rotation on a different axis, to provide a gear reduction, or to provide some other mechanical effect. These modifications may be provided to, e.g., control a relationship between the input torque and an output torque, to convert a rotational motion into a linear motion, or to provide some other benefit according to an application. Further, while particular elements of a transmission described herein may be characterized and/or described as an "input," an "output," or a "ground" (i.e., an element rigidly coupled to a mechanical ground in order to facilitate transmission of rotation and/or torque through a transmission), these characterizations are intended as non-limiting. Elements described as "input," "output," or "ground" may be reconfigured and/or repurposed. For example, the "input" 750 of the transmission 700 depicted in FIG. 7 could be grounded, permitting the "output" 710 to be operated as an output or as an input of the transmission 700 when the first split pulley 760a, 760b is ungrounded such that the first split pulley 760a, 760b may be operated as an output or as an input of the transmission 700.

IV. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A coupling for transmitting torque from a first axis of rotation to a second axis of rotation that are offset from each other, the coupling comprising:
    a first member configured to rotate about the first axis of rotation, wherein the first member has a first plurality of holes and a second plurality of holes;
    a second member configured to rotate about the second axis of rotation and having a third plurality of holes, wherein the first member and the second member are coupled to each other such that (i) the first axis of rotation of the first member and the second axis of rotation of the second member are parallel and maintained at a set offset distance relative to each other, and (ii) each hole of the third plurality of holes is disposed between a corresponding hole of the first plurality of holes and a corresponding hole of the second plurality of holes;
    a plurality of pins, wherein each respective pin of the plurality of pins is disposed within a respective hole of the first plurality of holes, a respective hole of the second plurality of holes, and a respective hole of the third plurality of holes, wherein the plurality of pins transmit forces resulting in torque between the first member and the second member;
    a housing; and
    a third member, wherein the third member comprises an input shaft coupled to a cam, wherein the cam is slidably coupled to the first member such that rotation of the input shaft causes (i) the first axis of rotation to orbit about the second axis of rotation, and (ii) cycloidal motion of the first member relative to the housing.

2. The coupling of claim 1, wherein the plurality of pins comprises at least three pins.

3. The coupling of claim 1, wherein the plurality of pins comprises at least four pins.

4. The coupling of claim 1, wherein the first member comprises a first plate and a second plate that are rigidly coupled to each other, wherein the first plate has the first plurality of holes and the second plate has the second plurality of holes, and wherein the second member comprises a plate that has the third plurality of holes.

5. The coupling of claim 4, wherein the plate of the second member has a plurality of additional holes, wherein the first member further comprises a plurality of support members, wherein the first plate of the first member and the second plate of the first member are rigidly coupled to each other via the plurality of support members, and wherein each respective support member of the plurality of support members extends through a respective additional hole of the plurality of additional holes in the plate of the second member.

6. The coupling of claim 4, wherein the first plate of the first member is rigidly coupled to the second plate of the first member via a structure that partially encloses the plate of the second member.

7. The coupling of claim 1, wherein the first member further comprises a first plurality of rods extending from the first member parallel to the first axis, wherein the second member comprises a second plurality of rods extending from the second member parallel to the second axis, and wherein the coupling further comprises:
    a first plurality of rollers, wherein each respective roller of the first plurality of rollers is in contact with a respective rod of the first plurality of rods and a respective rod of the second plurality of rods, wherein the first plurality of rollers transmit forces resulting in torque between the first member and the second member.

8. The coupling of claim 7, further comprising:
    a plurality of cages, wherein each respective cage of plurality of cages maintains a respective roller of the first plurality of rollers in contact with a respective rod of the first plurality of rods and a respective rod of the second plurality of rods.

9. The coupling of claim 8, wherein at least one cage of the plurality of cages includes a material comprising at least one of brass, polyoxymethylene, or acrylonitrile butadiene styrene.

10. The coupling of claim 1, wherein the housing comprises a ring gear, and wherein the first member is in contact with the housing via the ring gear.

11. The coupling of claim 1, wherein the first member comprises a first bearing surface, wherein the housing comprises a second bearing surface, and wherein the coupling further comprises:
    a plurality of bearings, wherein each bearing of the plurality of bearings is in contact with the first bearing surface and the second bearing surface, and wherein a shape of the first bearing surface, a shape of the second bearing surface, and a shape of each bearing of the plurality of bearings are specified such that cycloidal motion of the first member relative to the housing causes each bearing of the plurality of bearings to rotate and to engage in cycloidal motion.

12. The coupling of claim 1, wherein the first member comprises a first pulley, wherein the housing comprises a second pulley, and wherein the coupling further comprises:
    a belt that couples the first pulley to the second pulley.

13. A coupling for transmitting torque from a first axis of rotation to a second axis of rotation that are offset from each other, the coupling comprising:
    a first member configured to rotate about the first axis of rotation, wherein the first member has a first plurality of holes and a second plurality of holes;
    a second member configured to rotate about the second axis of rotation and having a third plurality of holes, wherein the first member and the second member are coupled to each other such that (i) the first axis of rotation of the first member and the second axis of rotation of the second member are parallel and maintained at a set offset distance relative to each other, and (ii) each hole of the third plurality of holes is disposed between a corresponding hole of the first plurality of holes and a corresponding hole of the second plurality of holes;
    a plurality of pins, wherein each respective pin of the plurality of pins is disposed within a respective hole of the first plurality of holes, a respective hole of the second plurality of holes, and a respective hole of the third plurality of holes, wherein the plurality of pins transmit forces resulting in torque between the first member and the second member;

a housing; and a third member, wherein the third member comprises an input shaft coupled to a cam, wherein the cam is slidably coupled to the second member such that rotation of the input shaft causes (i) the second axis of rotation to orbit about the first axis of rotation, and (ii) cycloidal motion of the second member relative to the housing.

14. The coupling of claim 13, wherein the housing comprises a ring gear, and wherein the second member is in contact with the housing via the ring gear.

15. The coupling of claim 13, wherein the second member comprises a first bearing surface, wherein the housing comprises a second bearing surface, and wherein the coupling further comprises:

a plurality of bearings, wherein each bearing of the plurality of bearings is in contact with the first bearing surface and the second bearing surface, and wherein a shape of the first bearing surface, a shape of the second bearing surface, and a shape of each bearing of the plurality of bearings are specified such that cycloidal motion of the second member relative to the housing causes each bearing of the plurality of bearings to rotate and to engage in cycloidal motion.

16. The coupling of claim 13, wherein the second member comprises a first pulley, wherein the housing comprises a second pulley, and wherein the coupling further comprises:

a belt that couples the first pulley to the second pulley.

17. The coupling of claim 13, wherein the first member comprises a first pulley, wherein the housing comprises a second pulley, and wherein the coupling further comprises:

a belt that couples the first pulley to the second pulley.

18. A coupling for transmitting torque from a first axis of rotation to a second axis of rotation that are offset from each other, the coupling comprising:

a first member configured to rotate about the first axis of rotation, wherein the first member comprises a first plurality of rods extending from the first member parallel to the first axis;

a second member configured to rotate about the second axis of rotation, wherein the first member and the second member are coupled to each other such that the first axis of rotation of the first member and the second axis of rotation of the second member are parallel and maintained at a set offset distance relative to each other, wherein the second member comprises a second plurality of rods extending from the second member parallel to the second axis; and a first plurality of rollers, wherein each respective roller of the first plurality of rollers is in contact with a respective rod of the first plurality of rods and a respective rod of the second plurality of rods, wherein the first plurality of rollers transmits torque from the first member to the second member, and wherein rotation of the first member about the first axis of rotation results in each respective roller of the first plurality of rollers engaging in rolling motion with a respective contact surface of a respective rod of the first plurality of rods.

19. The coupling of claim 18, further comprising:

a housing; and a third member, wherein the third member comprises an input shaft coupled to a cam, wherein the cam is slidably coupled to the first member such that rotation of the input shaft causes (i) a rotation of the first axis of rotation about the second axis of rotation, and (ii) cycloidal motion of the first member relative to the housing.

20. The coupling of claim 18, further comprising:

a housing; and a third member, wherein the third member comprises an input shaft coupled to a cam, wherein the cam is slidably coupled to the second member such that rotation of the input shaft causes (i) a rotation of the second axis of rotation about the first axis of rotation, and (ii) cycloidal motion of the second member relative to the housing.

* * * * *